United States Patent [19]

Buzzi

[11] 4,449,740

[45] May 22, 1984

[54] PRESSURE HOSE

[75] Inventor: Günther Buzzi, Schiltach, Fed. Rep. of Germany

[73] Assignee: Hans Grohe GmbH & Co., Fed. Rep. of Germany

[21] Appl. No.: 354,304

[22] Filed: Mar. 3, 1982

[30] Foreign Application Priority Data

Mar. 12, 1981 [DE] Fed. Rep. of Germany ....... 3109359

[51] Int. Cl.³ .............................................. F16L 39/02
[52] U.S. Cl. ..................................... 285/149; 285/258
[58] Field of Search ................ 285/258, 259, 256, 149

[56] References Cited

U.S. PATENT DOCUMENTS

| 3,251,612 | 5/1966 | Webbe | 285/256 X |
| 4,083,584 | 4/1978 | Buzzi | 285/258 |
| 4,335,753 | 6/1982 | Frye | 285/258 X |

FOREIGN PATENT DOCUMENTS

| 7600734 | 7/1976 | Fed. Rep. of Germany . | |
| 687497 | 2/1953 | United Kingdom | 285/256 |

Primary Examiner—Dave W. Arola
Attorney, Agent, or Firm—Steele, Gould & Fried

[57] ABSTRACT

The pressure hose is preferably a shower hose having an inner hose and an outer hose, between which can be provided preferably axially directed reinforcing threads and/or a reinforcing helix. At the free end of the pressure hose is provided a connecting nipple comprising two cross-sectionally in each case substantially circular jackets between which is clamped the hose end. In the clamping area, the inner hose and optionally the reinforcing thread surrounding it are longer than the outer hose and the reinforcing coil and are wrapped round towards the outside to form a hose wall reinforcement, which, after compressing the two jackets, ensures a reliable hold of the connecting nipple.

5 Claims, 4 Drawing Figures

PRESSURE HOSE

BACKGROUND OF THE INVENTION

The invention relates to a pressure hose, particularly a shower hose with an internal hose and an external hose, as well as at least one connecting fitting or nipple, having two concentrically arranged, cross-sectionally in each case substantially circular envelopes or jackets, between which is clamped one hose end.

In the case of such a hose, known e.g. from German Utility Model No. 7,600,734, for fixing the connecting nipple to the hose, a separate, double-walled and form-elastic sealing sleeve is provided, which has to be placed over the free hose end prior to the expanding or widening of the inner nipple jacket, i.e. prior to compressing the two nipple jackets. Although this nipple fixing procedure has proved satisfactory, it is relatively complicated and costly due to the separate sealing sleeve. In addition, said sealing sleeve does not in all cases ensure a 100% seal between inner hose and outer hose. Thus, if a reinforcing helix is provided between the inner hose and the outer hose, helical cavities are formed between the two hoses, which lead to zones with a reduced contact pressure, so that in certain circumstances, e.g. very hot water, moisture can creep along the sealing faces and at the cut-off hose end can pass beneath the sealing sleeve into the openings of the helical cavity. When this takes place, a film of moisture forms in the gap between the inner and outer hoses, so that the entire hose acquires a dull, unattractive appearance.

BRIEF SUMMARY OF THE INVENTION

The object of the invention is to obviate this problem, i.e. to improve a pressure hose of the aforementioned type with respect to the nipple attachment.

According to the invention, this problem is solved by a pressure hose of the aforementioned type through the inner hose being longer than the outer hose in the connection side nipple area and is wrapped over towards the outside. In the hose according to the invention, it is merely necessary prior to compressing the two nipple jackets to remove a portion of the outer hose and to wrap round towards the outside the thus exposed end of the inner hose. This simple measure makes the aforementioned sealing sleeve dispensible, whilst still ensuring a completely satisfactory seal between the inner hose and the outer hose.

According to a preferred embodiment of the pressure hose according to the invention in which a reinforcing helix is positioned between the inner hose and the outer hose, a portion of the outer hose and a corresponding portion of the reinforcing helix are to be removed prior to compressing the two nipple jackets and the exposed end of the inner hose is to be wrapped around towards the outside, i.e. in this case in the connection side nipple area the inner hose is longer than both the outer hose and the reinforcing helix. Here again, the aforementioned sealing sleeve is dispensible, but nevertheless a completely satisfactory seal is ensured between the three hose layers. The same also applies regarding other preferred embodiments of the hose according to the invention in which 8, preferably 14 to 20 multifilament reinforcing threads are provided. which are at least zonally connected to the inner hose and in the nipple area have a particularly good anchoring because their wrapping round by 180° and the subsequent compression of the two nipple jackets give anchoring values for the reinforcing threads, which are well above the tensile strength of said threads. Thus, in the case of the hose according to the invention, between the latter and the connecting nipple, a pull-out resistance can be achieved, which is well above the tensile strength of the hose.

In the case of the hose according to the invention, the inner hose is preferably made from rubber. However, with the hose according to the invention the inner hose can also be made from a soft plastics material.

The length of the wrapped-round end of the inner hose in each case corresponds to at least a quarter and preferably a third to a half of the nipple length.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
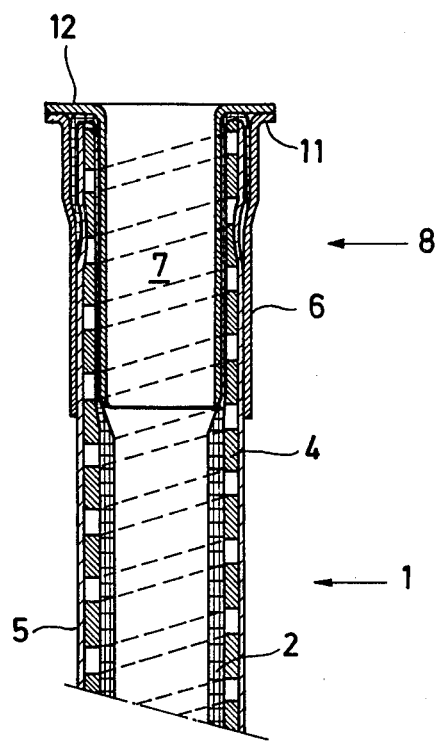
FIG. 1 is a section view of one end of a hose according to the invention.

The represented hose end 1 is the end of a shower hose with an inner hose 2, axially directed reinforcing threads 3, a reinforcing helix 4 and an outer hose 5.

The upwardly directed end of said shower hose shown in FIG. 1 is provided with a connecting nipple 8 comprising two concentrically arranged jackets 6, 7. In the connection side area of connecting nipple 8, i.e. the area directed upwards in FIG. 1, inner hose 2 and the reinforcing threads 3 passed around it are in each case longer than the reinforcing helix 4 and the outer hose 5 which surrounds it. They are gently wrapped round outwards with a length corresponding approximately to one third of the total length of connecting nipple 8.

Figure 2:
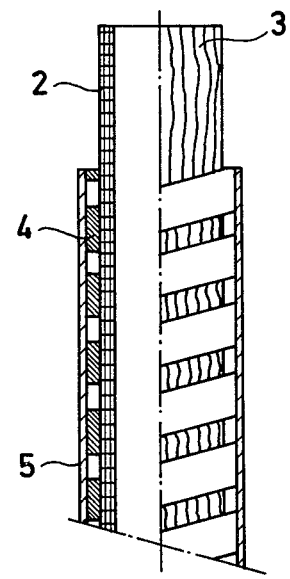
FIGS. 2 to 4 are section views showing different production stages of the hose end shown in FIG. 1.

The following procedure can be adopted for fixing the connecting nipple 8 to the free end of the hose 1. Firstly, at the free hose end, outer hose 5 and reinforcing helix 4 are to be cut off in a length corresponding approximately to a third of the total length of connecting nipple 8 and this operation can be performed e.g. with a knife. Inner hose 2 and the substantially axially directed reinforcing threads 3 around it retain their original length (cf FIG. 2).

The outer jacket 6 connecting nipple 8 is now passed over the thus prepared free hose end. Jacket 6 has two areas or portions 9, 10 having different internal diameters and which pass into one another by means of a funnel-shaped widened part. They comprise a downwardly directed position 9, whose internal diameter substantially corresponds to the external diameter of outer hose 5 and an upwardly directed portion 10 having a larger internal diameter (the drawing). At its free end, portion 10 of outer jacket 6 has an outwardly projecting flange 11, whose external diameter substantially corresponds to the external diameter of a flange 12 provided on the upwardly directed end of inner sleeve 7 of connecting nipple 8.

Figure 3:
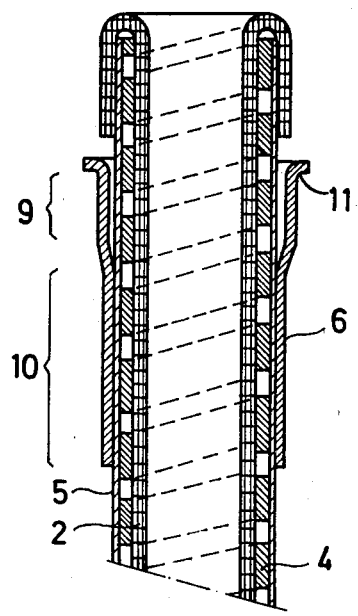

When outer jacket 6 of connecting nipple 8 has been fitted roughly to the extent represented in FIG. 3, the areas of inner hose 2 projecting over the reinforcing helix 4 and outer hose 5, as well as the reinforcing threads 3 passed round hose 2 are wrapped round towards the outside. The length of the area wrapped round towards the outside corresponds essentially to the length of the aforementioned portion 9 of the outer nipple jacket 6.

Figure 4:
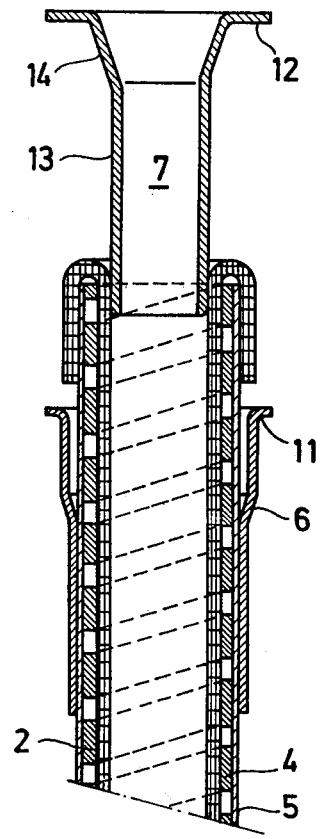

On completing the wrapping round of inner hose 2 and reinforcing threads 3, outer jacket 6 of the connecting nipple is displaced towards the free hose end. Simultaneously, or subsequently, the end of the inner jacket 7 remote from flange 12 is inserted in the free hose end (cf FIG. 4). The jacket portion 13 following onto the insertion end of the inner jacket 7 has, prior to the compression of the two jackets 6, 7, an external diameter essentially corresponding to the internal diameter of inner hose 2, so that no problems are caused by the insertion of the inner jacket. A portion 14, which widens in funnel-shaped manner and passes into the aforementioned flange 12 follows at the top onto the cylindrical portion of inner jacket 7 (cf the drawing).

When outer jacket 6 and inner jacket 7 have been displaced with respect to one another to such an extent that the wrapped round portion of inner hose 2 is completely positioned in the portion 10 of outer jacket 6 having the larger internal diameter and flange 11 of outer jacket 6 engages from below on flange 12 of the inner jacket, it is possible to start the compression of the two jackets 6, 7 using a suitable tool, e.g. an expanding mandrel. After compressing the two jackets, the inner jacket has throughout an internal diameter, which substantially corresponds to the internal diameter of inner hose 2. Where the inner hose and reinforcing threads are double, i.e. at the free end of nipple 8, the hose is compressed to such an extent that its wall thickness corresponds approximately to that of the uncompressed hose.

What is claimed is:

1. A pressure hose comprising:
   an inner hose;
   an outer hose;
   a reinforcing helix arranged between the outer hose and the inner hose;
   a plurality of axially directed reinforcing threads; disposed along the inner hose and,
   at least one connecting nipple having concentric inner and outer sleeves of substantially circular cross-section, and between which sleeves is clamped one end of the pressure hose;
   the inner hose and the reinforcing threads at end being longer than the outer hose and the reinforcing helix, the end of the inner hose and the reinforcing threads projecting beyond the reinforcing helix and the outer hose, said end of the inner hose and the reinforcing threads being wrapped around about 180° over the reinforcing helix and the outer hose, and clamped between said concentric sleeves.

2. The pressure hose of claim 1, wherein the wrapped-around end, including the inner hose and the reinforcing threads, is at least a quarter as long as the connecting nipple.

3. The pressure hose of claim 1, wherein the wrapped-around end, including the inner hose and the reinforcing threads, is a third to a half as long as the connecting nipple.

4. The pressure hose of claim 1 or 3, wherein the outer sleeve comprises sections of two different internal diameters, which sections are joined to one another by means of a funnel shaped widening part, a smaller section thereof having an internal diameter substantially the same as an external diameter of the outer hose, and a larger section having a length substantially the same as the length of the wrapped-around area of the inner hose and the reinforcing threads.

5. The pressure hose of claim 4, wherein the inner sleeve has an external diameter substantially the same as the internal diameter of the inner hose, and said end which has the inner hose wrapped around the reinforcing helix and the outer hose is clamped between the concentric sleeves and compressed such that the inner hose, as wrapped-around and clamped, has a total wall thickness approximately the same as a single wall thickness thereof as uncompressed.

* * * * *

UNITED STATES PATENT AND TRADEMARK OFFICE
CERTIFICATE OF CORRECTION

PATENT NO. : 4,449,740

DATED : May 22, 1984

INVENTOR(S) : Gunther Buzzi

It is certified that error appears in the above-identified patent and that said Letters Patent is hereby corrected as shown below:

Column 1, line 64, after "provided" delete the period and insert therefor --,--.

Signed and Sealed this

Eighteenth Day of February 1986

[SEAL]

Attest:

DONALD J. QUIGG

Attesting Officer

Commissioner of Patents and Trademarks